US012643283B1

(12) United States Patent
Heikkilä et al.

(10) Patent No.: US 12,643,283 B1
(45) Date of Patent: Jun. 2, 2026

(54) METHODS, SYSTEMS, AND APPARATUSES FOR MANUFACTURING WEARABLE RING DEVICES

(71) Applicant: NaturalCycles Nordic AB, Stockholm (SE)

(72) Inventors: Mikael Heikkilä, Oulu (FI); Hannu Tiainen, Oulu (FI); Manuel Jose Aberg Cobo, Stockholm (SE)

(73) Assignee: NaturalCycles Nordic AB, Stockholm (SE)

( * ) Notice: Subject to any disclaimer, the term of this patent is extended or adjusted under 35 U.S.C. 154(b) by 0 days.

(21) Appl. No.: 19/386,379

(22) Filed: Nov. 12, 2025

Related U.S. Application Data

(63) Continuation of application No. 19/375,956, filed on Oct. 31, 2025.

(60) Provisional application No. 63/777,748, filed on Mar. 26, 2025.

(51) Int. Cl.
| | |
|---|---|
| *B29C 63/18* | (2006.01) |
| *B29C 63/00* | (2006.01) |
| *B29K 63/00* | (2006.01) |
| *B29K 75/00* | (2006.01) |
| *B29L 31/00* | (2006.01) |
| *B29L 31/34* | (2006.01) |

(52) U.S. Cl.
CPC .......... *B29C 63/18* (2013.01); *B29C 63/0004* (2013.01); *B29C 63/0017* (2013.01); *B29K 2063/00* (2013.01); *B29K 2075/00* (2013.01); *B29L 2031/3425* (2013.01); *B29L 2031/7096* (2013.01); *B29L 2031/743* (2013.01)

(58) Field of Classification Search
CPC ..... B29C 65/366; B29C 65/225; B29C 66/51; B29C 66/432; B29C 53/583; B29C 53/564; B29C 2045/2862; B29C 2045/1719; B29C 44/324; B29C 63/0017; B29C 63/0004; B29C 63/18
See application file for complete search history.

(56) References Cited

U.S. PATENT DOCUMENTS

| | | | |
|---|---|---|---|
| 9,861,314 | B2 | 1/2018 | Haverinen et al. |
| 10,893,833 | B2 | 1/2021 | Haverinen et al. |
| 11,599,147 | B2 | 3/2023 | Von Badinski et al. |
| 11,850,069 | B1 | 12/2023 | Mars et al. |

(Continued)

FOREIGN PATENT DOCUMENTS

| | | | |
|---|---|---|---|
| SG | 2013031273 A | 11/2014 | |

OTHER PUBLICATIONS

U.S. Appl. No. 19/375,956, filed Oct. 31, 2025; Inventor Heikkila, Mikael et al.

*Primary Examiner* — Stella K Yi
(74) *Attorney, Agent, or Firm* — COOLEY LLP

(57) ABSTRACT

Methods, systems, and apparatuses for manufacturing wearable devices are described herein. A method can comprise coupling a plurality of printed circuit boards to a tubular structure, coupling an outer layer to the tubular structure over the plurality of printed circuit boards to form a tubular assembly, each printed circuit board is disposed between a portion of the tubular structure and a portion of the outer layer, and separating the tubular assembly into a plurality of ring-shaped devices each including a printed circuit board of the plurality of printed circuit boards, the portions of the tubular structure and the outer layer disposed around the printed circuit board.

20 Claims, 15 Drawing Sheets

(56)                    References Cited

U.S. PATENT DOCUMENTS

| | | |
|---|---|---|
| 12,052,816 B1 | 7/2024 | Mars et al. |
| 12,263,623 B2 | 4/2025 | Lamsa |
| 12,379,744 B2 | 8/2025 | Tiensuu |
| 12,393,227 B2 | 8/2025 | Von Badinski et al. |
| 12,429,909 B2 | 9/2025 | Von Badinski et al. |
| 12,429,910 B2 | 9/2025 | Von Badinski et al. |
| 2012/0313272 A1 | 12/2012 | Fullam et al. |
| 2024/0081012 A1* | 3/2024 | Haverinen ........... A61B 5/6826 |
| 2024/0164716 A1 | 5/2024 | Mars et al. |
| 2024/0241541 A1 | 7/2024 | Makinen |
| 2025/0025101 A1 | 1/2025 | Huttunen |
| 2025/0064396 A1 | 2/2025 | Tiensuu et al. |
| 2025/0089863 A1 | 3/2025 | Haverinen et al. |
| 2025/0090095 A1 | 3/2025 | Haverinen et al. |
| 2025/0099036 A1 | 3/2025 | Huopana |
| 2025/0108545 A1 | 4/2025 | Haverinen et al. |
| 2025/0135689 A1 | 5/2025 | Lamsa |
| 2025/0199579 A1 | 6/2025 | Von Badinski et al. |
| 2025/0211965 A1 | 6/2025 | Mars et al. |
| 2025/0224767 A1 | 7/2025 | Haverinen et al. |
| 2025/0236054 A1 | 7/2025 | Lamsa |

* cited by examiner 312a
312c
310
312d
312b 320
320
312a  312c
310
320  320
312d
312b

300

330
310

340b  330c  340d
330a
340a  330b  340c
330d 340a, 340b,
340c, 340d 330a, 330b,
330c, 330d 310a, 310b,
310c, 310d 320a, 320b,
320c, 320d

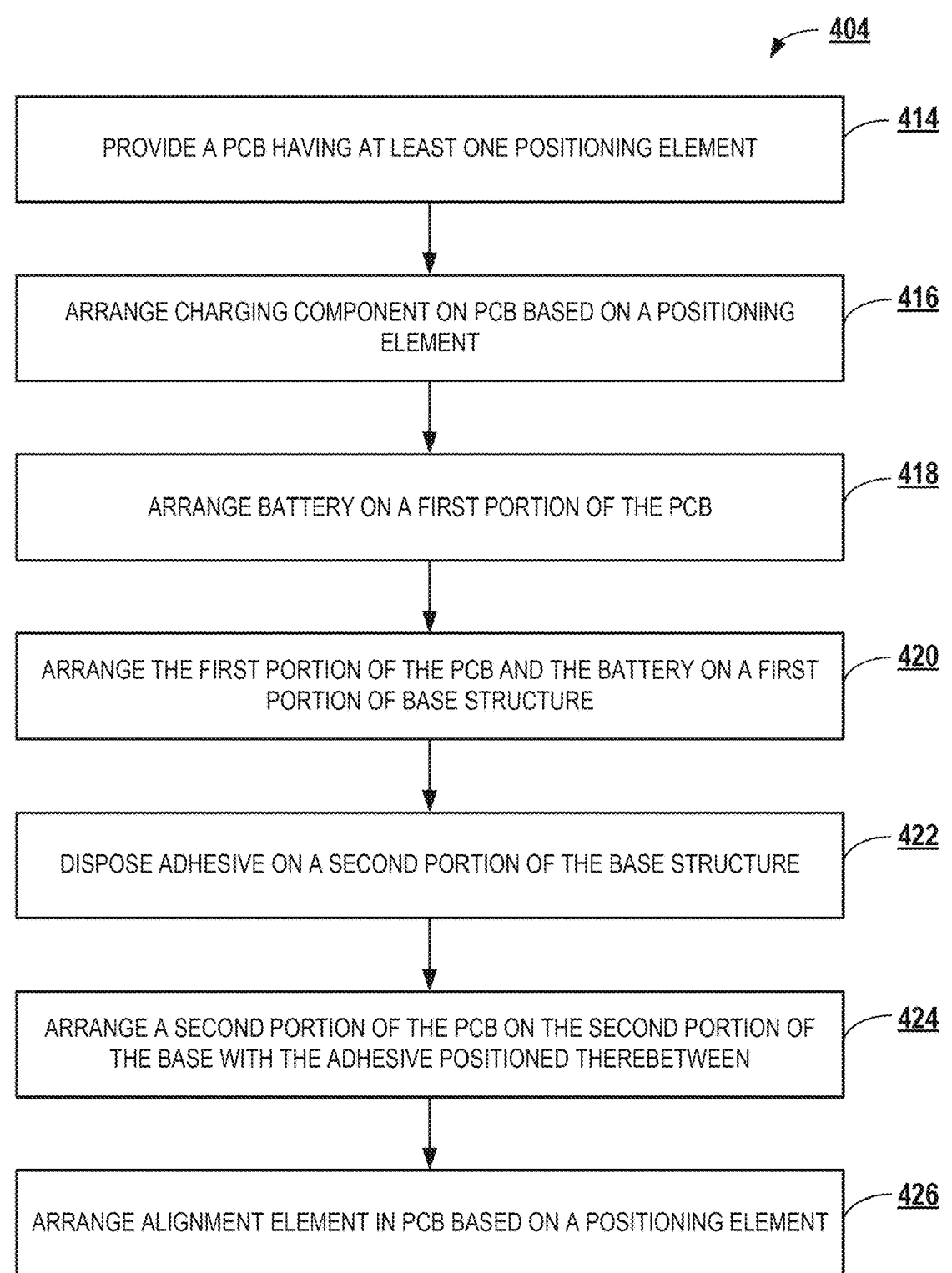

404

PROVIDE A PCB HAVING AT LEAST ONE POSITIONING ELEMENT ⎯ 414

ARRANGE CHARGING COMPONENT ON PCB BASED ON A POSITIONING ELEMENT ⎯ 416

ARRANGE BATTERY ON A FIRST PORTION OF THE PCB ⎯ 418

ARRANGE THE FIRST PORTION OF THE PCB AND THE BATTERY ON A FIRST PORTION OF BASE STRUCTURE ⎯ 420

DISPOSE ADHESIVE ON A SECOND PORTION OF THE BASE STRUCTURE ⎯ 422

ARRANGE A SECOND PORTION OF THE PCB ON THE SECOND PORTION OF THE BASE WITH THE ADHESIVE POSITIONED THEREBETWEEN ⎯ 424

ARRANGE ALIGNMENT ELEMENT IN PCB BASED ON A POSITIONING ELEMENT ⎯ 426

METHODS, SYSTEMS, AND APPARATUSES FOR MANUFACTURING WEARABLE RING DEVICES

CROSS REFERENCE TO RELATED APPLICATIONS

This application is a continuation of U.S. patent application Ser. No. 19/375,956, filed Oct. 31, 2025, and titled "METHODS, SYSTEMS, AND APPARATUSES FOR MANUFACTURING WEARABLE RING DEVICES," which claims priority to U.S. Provisional Patent Application No. 63/777,748, filed Mar. 26, 2025, and titled "METHODS, SYSTEMS, AND APPARATUSES FOR MANUFACTURING WEARABLE RING DEVICES," the contents of each of which are incorporated by reference herein in their entirety.

TECHNICAL FIELD

The present disclosure relates to wearable sensor devices, and in particular to methods of manufacturing wearable ring devices.

BACKGROUND

Wearable devices are often worn to quickly and effectively indicate health information, such as physiological data, to users. A wearable device often masks electronics with an outer coating or outer housing, thus presenting a sleek design. For example, a wearable ring may have a metallic coating that conceals the technological nature of the device. Some existing methods of manufacturing a wearable device involve positioning or placing electronics (e.g., sensors or other circuitry) on a frame and/or within a housing. As wearable devices become sleeker and/or minimal in design and more sophisticated in technology, existing methods of manufacturing become more challenging and time consuming. For example, smaller wearable devices, such as rings, may prove complex to manufacture as such devices require the same or more technological features as other, larger wearable devices, such as watches or chest straps. Thus, there is a need to develop devices and methods that reduce manufacturing complexities associated with producing wearable devices.

SUMMARY

Methods, systems, and apparatuses for manufacturing wearable devices are described herein. In some embodiments, a method can comprise coupling a plurality of printed circuit boards to the tubular structure, coupling an outer layer to the tubular structure over the plurality of printed circuit boards to form a tubular assembly in which each printed circuit board of the plurality of printed circuit boards is disposed between a portion of the tubular structure and a portion of the outer layer, and separating the tubular assembly into a plurality of ring-shaped devices each including a printed circuit board of the plurality of printed circuit boards, the portions of the tubular structure and the outer layer disposed around the printed circuit board.

In some embodiments, a method can comprise coupling an end of a curved battery to a printed circuit board, wrapping the curved battery and the printed circuit board around a tubular structure such that the curved battery and the printed circuit board are disposed between adjacent positioning element of a plurality of positioning elements disposed along the tubular structure and are spaced from additional curved batteries and printed circuit boards wrapped around the tubular structure, and securing the curved battery and the printed circuit board to the tubular structure using adhesive tape.

BRIEF DESCRIPTION OF THE DRAWINGS

FIGS. 4A and 4B are flowcharts of example method(s) of manufacturing one or more wearable ring-shaped devices, according to an embodiment.

DETAILED DESCRIPTION

The embodiments described herein relate generally to wearable devices, and in particular to methods, systems, and apparatuses for manufacturing wearable devices. In some embodiments, systems, devices, and methods described herein can be used with or to produce wearable ring-shaped devices (also referred to as "wearable ring devices," "wearable rings," or "ring-shaped devices"). Alternatively, systems, devices, and methods described herein can be adapted for use with or to produce other types of wearable devices, e.g., wrist-worn wearable devices, head-worn wearable devices, clip-on devices, patches or skin-worn wearable devices, etc. Moreover, systems, devices, and methods described herein can be used with or to produce a wearable device of any size (e.g., wearable ring-shaped devices having sizes in a range from US3-US16) or shape. The methods described herein may result in manufacturing efficiencies that limit or prevent material waste, cost waste, time waste, etc., in producing wearable devices. For example, methods described herein can enable high volume production of wearable devices by assembling wearable devices in parallel, rather than individually assembling wearable devices in sequence with one another. Put differently, methods described herein may enable otherwise repetitive, time-consuming tasks to be limited and/or standardized. By limiting the amount of manufacturing steps, methods described herein increase the likelihood of uniformity between the assembled devices due to less opportunities for procedural differences, human error, operator preferences, etc. As such, methods described herein improve the quality of assembled wearable devices while reducing manufacturing complexities and costs of assembly.

Figure 1:
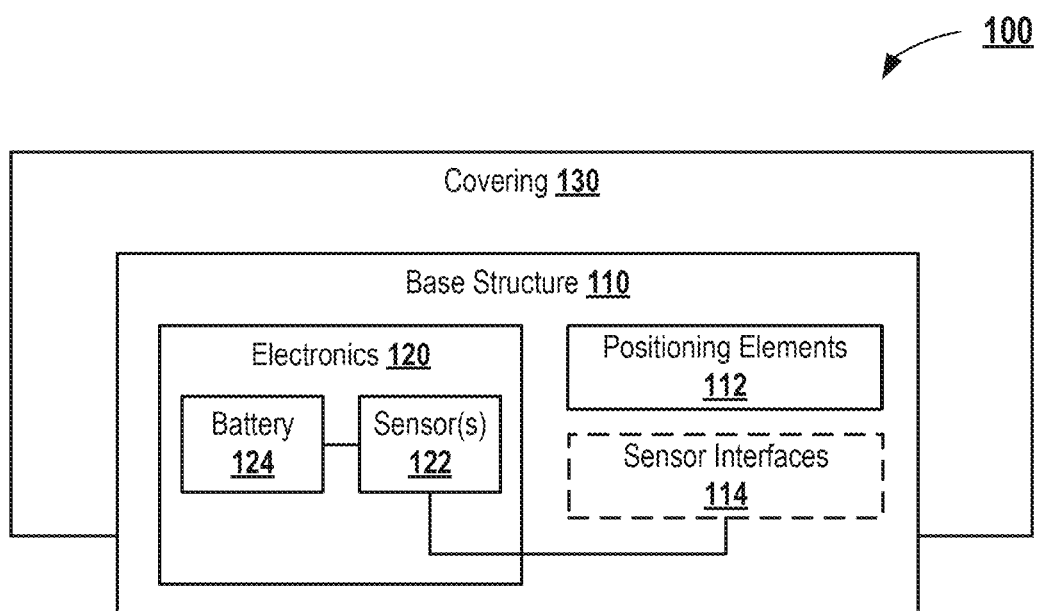
FIG. 1 is a schematic illustration of a tubular assembly that can be separated (e.g., cut) to make one or more wearable ring-shaped devices, according to an embodiment.

FIG. 1 shows a schematic illustration of a tubular assembly 100 that can be cut to manufacture one or more wearable ring devices, according to an embodiment. Generally, the tubular assembly 100 may include a base structure 110 and a covering 130. The base structure 110 includes a positioning elements 112 and supports a plurality of electronics 120. Optionally, the base structure 110 includes one or more sensor interfaces 114. The electronics 120 can include one or more sensor(s) 122 and a battery or other onboard power source 124.

The base structure 110 can be any suitable structure configured to receive, support, and/or interface with the electronics 120. In some embodiments, the base structure 110 is a tubular structure. For example, the base structure 110 can have a circular, ovular, rounded, etc., cross-section such that the base structure 110 is a tube, cylinder, pipe, rod, etc. In some embodiments, the base structure 110 is a metal pipe. In some embodiments, the base structure 110 can be formed of a series or stack of rings or smaller annular structures that are attached to one another. In such embodiments, the rings can be stacked with another material between them, e.g., an adhesive, a plastic, a metal (e.g., aluminum, time, etc.). The rings can be concentric with one another so that together the rings form a larger elongate structure. In some embodiments, different rings in the stack can also have different properties, e.g., have different dimensions or other characteristics. For example, a first one of the rings may have a length different than that of a second one of the rings. Additionally, or alternatively, a first one of the rings may have a diameter that is different than that of a second one of the rings. In some embodiments, the base structure 110 tapers in a direction from a first end to a second end of the base structure 110. As such, the base structure 110 can have a non-uniform cross-section. For example, the base structure 110 can have a circular cross section that increases or decreases in diameter in a direction from the first end of the base structure 110 to the second end of the base structure 110. In such embodiments, the base structure 110, when cut into separate sections, can be used to form different sized wearable ring-shaped devices. In some embodiments, the base structure 110 has a cross-section that has a uniform shape and/or size along a length of the base structure 110. For example, the base structure 110 can have a circular cross section that maintains substantially the same diameter (e.g., within 0.5 millimeter (mm)) from the first end to the second end of the base structure 110 (e.g., along a longitudinal length of the base structure 110). In some embodiments, the base structure 110 has an inner diameter of between about 10 mm and about 25 mm, inclusive of all sub-ranges and values therebetween. In some embodiments, the base structure 110 includes a length of greater than about 5 centimeters (cm), greater than about 6 cm, greater than about 7 cm, greater than about 8 cm, greater than about 9 cm, greater than about 10 cm, greater than about 15 cm, greater than about 20 cm, greater than about 25 cm, greater than about 50 cm, or greater than 100 cm, inclusive of all sub-ranges and values therebetween. For example, in some embodiments, the base structure 110 can have a length of between about 5 cm and about 20 cm, inclusive of all sub-ranges and values therebetween. In some embodiments, the base structure 110 includes at least one surface (e.g., an outer surface) configured to contact and support the electronics 120. Further, the base structure 110 can include at least one surface (e.g., an inner surface) configured to contact skin of a user (e.g., a finger of a user). In some embodiments, the base structure 110 is configured to be separated, severed, cut, portioned, partitioned, etc., to define a plurality of base structure portions which, in turn, may be formed into a plurality of wearable devices (e.g., wearable rings or ring-shaped devices), as described in detail in connection later figures (e.g., FIG. 4A).

The electronics 120 can provide hardware and/or firmware configured to measure or monitor one or more physiological parameters of a user and/or analyze, store, or provide access to data associated with one or more physiological parameters of a user wearing a ring-shaped device including the electronics 120. In some embodiments, the electronics 120 can include a printed circuit board (PCB) 120. The PCB 120 can include the sensors 122 that can be configured to measure physiological data associated with a user of the example wearable device. For example, the sensor(s) 122 can include one or more electrodes, photoplethysmography (PPG) sensors, temperature sensors, motion sensors, skin conductance sensors, or other suitable sensors configured to measure one or more physiological parameters of a user. In some embodiments, the sensor(s) 122 are integrated sensors on the PCB 120. Alternatively, the sensor(s) 122 are separate devices couplable to the PCB 120. In some embodiments, the sensor(s) 122 can be configured to periodically capture physiological data of the user, e.g., at set intervals, on demand, or during one or more defined periods (e.g., sleep). In some embodiments, the sensor(s) 122 can be configured to continuously monitor the physiological parameters of the user. The battery or other power source 124 can supply power to the sensor(s) 122 or other electronic component(s) of the PCB 120.

In some embodiments, the base structure 110 can support a plurality of electronics 120, such as a plurality of PCBs 120. Each PCB 120 can be positioned spaced from adjacent PCBs 120 on the base structure 110, e.g., with the spaces between PCBs 120 providing regions that can be cut, separated, etc. to form separate ring-shaped structures each including a PCB 120. Further details of such manufacturing processes are described with reference to FIGS. 2A-3E.

The PCB 120, including the battery 124 and the sensors 122, can have any suitable shaped configured to be supported on or interface with the base structure 110. For example, the PCB 120 can have a curved or contoured surface that aligns with or matches a curved or contoured surface of the base structure 110. In some embodiments, the PCB 120 defines a ring or annular shape. As such, the PCB 120 can have an inner annular surface that aligns with or matches an outer annular surface of the base structure 110. In some embodiments, the PCB 120 surrounds an outer surface (e.g., an outer annular surface, an outer curved surface, etc.) of the base structure 110. In some embodiments, the PCB 120 can extend around a full perimeter or circumference of the base structure 110. In some embodiments, the PCB 120 may extend a partial perimeter or circumference of the base structure 110. As such, the PCB 120 can have length that is less than a perimeter or circumference of the base structure 110. As described above, the PCB 120 is one of a plurality of PCBs 120 that can be positioned adjacent to one another along a longitudinal length of the base structure 110. As such, the base structure 110 can be at least between two or about 50 times the width (e.g., lateral dimension) of each individual PCB 120 along a longitudinal direction of the base structure 110, inclusive of all sub-ranges and values therebetween.

The positioning elements 112 can be any suitable structure configured to facilitate positioning of (e.g., guide positioning and/or arrangement of) the electronics 120 and/or other components along a longitudinal length of the base structure 110. For example, each positioning element 112 can be an indentation (e.g., cavity, divot, groove, channel, etc.) in a surface of the base structure 110. As such, the positioning element 112 may also be referred to herein as an "indentation." The indentation 112 can extend radially inward from an outer surface of the base structure 110. The indentation 112 can also have a width (e.g., a dimension along a longitudinal axis of the base structure 110) that can facilitate positioning of the electronics 120. For example, the indentation 112 can have a width that is substantially equal to or greater than a width of each electronics 120 (e.g., PCB 120), such that the electronics 120 can be placed within the indentations 112. Additionally, the indentation 112 can have a dimension that extends along the outside surface of the base structure 110 in a direction traverse to or substantially orthogonal to (e.g., within 5 degrees) the longitudinal axis of the base structure 110. In other words, the indentation 112 can circumferentially extend or trace the outside surface of the base structure 110. In some embodiments, the indentation 112 extends at least partially around the outside surface of the base structure 110. In such embodiments, the indentation 112 can form a C shape indentation in a side or portion of the outside surface of the base structure 110. In some embodiments, the indentation 112 extends fully around the outside surface of the base structure 110, e.g., defining an circumferential indentation or annular groove. In such embodiments, the positioning element 112 may be referred to as a "groove" or "annular groove."

While the positioning elements 112 are described as indentations above, it can be appreciated that protrusions, raised sections, etc. can also be used as positioning elements 112, e.g., to facilitate or guide positioning of the electronics 120 along the outer surface of the base structure 110. For example, a plurality of annular protrusions or rings can be added to the base structure 110, to define a plurality of regions for receiving electronics 120.

In some embodiments, the base structure 110 includes one positioning element 112. Alternatively, the base structure 110 includes any number of the positioning elements 112 (e.g., between about 2 and about 50, inclusive of sub-ranges or values therebetween). In some embodiments, the positioning elements 112 are spaced apart from one another across the base structure 110 (e.g., in the longitudinal direction, in a direction traverse to the longitudinal direction, etc.). For example, the grooves 112 may be spaced apart from one another along the longitudinal direction of the base structure 110. In such examples, the spaced apart grooves 112 define raised portions (e.g., ribs, walls, etc.) therebetween. In some embodiments, the grooves 112 are spaced apart from one another by at least a predetermined axial distance of 1 mm. Put differently, the raised portions that separate the grooves 112 can have an axial dimension of at least about 1 mm. In some embodiments, the positioning elements 112 can have an axial dimension (e.g., width) of between about 2 mm and about 10 mm, inclusive of all sub-ranges and values therebetween. For example, the positioning elements 112 can have an axial dimension of about 4 mm, or the positioning elements 112 can have an axial dimension of less than about 7 mm. In some embodiments, the positioning elements 112 can have a depth of about 2 mm or less than about 3 mm, inclusive of sub-ranges and values therebetween.

In some embodiments, the positioning elements 112 are defined or formed in the base structure 110 based on a manufacturing technique. For example, a cutting tool (e.g., a lathe) can form the indentations 112 in the base structure

110 by machining, cutting, carving, drilling, etc., into the base structure 110 (e.g., to remove material). Alternatively, the positioning elements 112 are structures added to the base structure 110. For example, the positioning elements 112 can be gaskets, ribs, walls, etc., positioned on or coupled to the base structure 110 that, when spaced apart from one another, define indentations, grooves, etc., therebetween. Additionally or alternatively, the positioning elements 112 can include adhesives (e.g., tape, double sided tape, glue, etc.) disposed on the base structure 110. Such adhesives can be configured to contact, grip, or otherwise attach to the PCBs 120 when the PCBs 120 are positioned on the base structure 110. Additionally or alternatively, the positioning elements 112 can include markers (e.g., visual markers), which can be drawn by paint, pencil, pen, etc., etched, engraved, imprinted, or otherwise added to the base structure 110. The markers can indicate locations to position the adhesives, the gaskets, the walls, the PCBs, etc., along the base structure 110.

In some embodiments, the PCBs 120 can be positioned on the base structure 110 by an automated machine (e.g., electromechanical device that is controlled via one or more processors). In such embodiments, the automated machine can be controlled to position the PCBs 120 at set positions along a length of the base structure 110 without guidance of any physical positioning elements 112. For example, the automated machine can have a memory that stores the preset positions of where to place the PCBs 120 along the length of the base structure 110. In some embodiments, the automated machine can also be configured to form a groove, opening, hole, window, etc. or other structures described herein, based on instructions stored in memory. An example automated machine can be a robotic device, e.g., a robotic arm, that is controlled by a processor configured to access or execute machine-readable instructions stored in a memory to place or position the PCBs 120 on the base structure 110. In such embodiments, the base structure 110 may not have any markings, indentations, grooves, etc., but the robotic device may know where to position the PCBs based on internally stored information of the characteristics or properties of the base structure 110, the characteristics or properties of the PCBs, the location of the base structure 110 relative to the robotic device, etc.

The positioning element 112 can provide a location on the base structure 110 within which the PCB 120 may be positioned. Further, the positioning element 112 can define locations on the base structure 110 to which a PCB may be coupled. In some embodiments, the indentation 112 is sized and/or shaped to receive at least a portion of a PCB 120. In such embodiments, an excess portion of the PCB 120 may be outside of or extending away from the portion of the PCB 120 in the indentation 112. Alternatively, the indentation 112 is sized and/or shaped to receive an entirety of the PCB. In such embodiments, the PCB 120 in the indentation 112 is flush or continuous with (e.g., within about 0.5 mm) the surface of the base structure 110 that includes the indentation 112. In some embodiments, the PCB 120 is coupled to the base structure 110 via an adhesive.

Optionally, in some embodiments, one or more sensor interfaces 114 can be provided in the base structure 110. The sensor interface 114 can include an indentation, opening, hole, cavity, passage, a transparent or translucent section, etc., in the base structure 110. The sensor interface 114 can be configured to permit the sensors 122 to interface with an external environment (e.g., via the hole). For example, the sensor interface 114 can enable the sensors 122 to interface with a user such that the sensors 122 can measure physiological data associated with the user. In some embodiments, the sensor interface 114 is a hole that extends through the outward facing surface and the inward facing surface of the base structure 110. As such, the sensor interface 114 may also be referred to herein as "hole," and/or "opening." The hole 114 may be aligned with the sensors 122 of the PCB 120. For example, the hole 114 may be positioned, shaped, and/or sized to receive at least a portion of one of the sensors 122. In some embodiments, the hole 114 is positioned at a location associated with the indentations 112. For example, the hole 114 may extend through the base structure 110 at the indentation 112. Alternatively, the hole 114 can be formed in the base structure 110 without there being a prior indentation, groove, or other similar structure. In some embodiments, the sensor interface 114 is one of a plurality of sensor interfaces 114. As such, the base structure 110 can include any number of sensor interfaces 114. For example, a number of the sensor interfaces 114 may be greater than or less than a number of the positioning elements 112. Alternatively, a number of the sensor interfaces 114 may correspond to a number of the positioning elements 112. For example, each sensor interface 114 may be paired with (e.g., positioned at) each positioning element 112.

Optionally, in some embodiments, one or more openings, holes, cavities, indentations, windows, passages, etc. can be formed in the base structure 110 and/or covering 130 to enable communication or contact with other devices. For example, one or more openings can be provided in the base structure 110 to enable placement of electrical contacts, e.g., for use in charging the wearable ring devices. As another example, one or more openings can be provided in the base structure 110 and/or covering 130 to enable passage of light, e.g., for providing indications and/or visual aesthetics to a user. In some embodiments, the openings or windows can be formed in the covering 130 and be pointing outward in the individual wearable devices, e.g., by post-processing the individual wearable devices after they have been formed, or by having protrusions (e.g., a tubular light guide of a LED) when the outer layer is applied or disposed around the base structure and the PCBs, such that the outer layer leaves a hole or window when it is applied.

The covering 130 can be any suitable structure configured to be disposed over or around (e.g., cover, enclose, etc.) the base structure 110. In particular, the covering 130 can be configured to cover the base structure 110 having at least one PCB 120 positioned on or coupled thereto. As such, the at least one PCB 120 can be positioned between the covering 130 and the base structure 110. In some embodiments, a portion of the covering 130 is an outer layer of a wearable device. The covering 130 may also be referred to herein as "outer layer."

Figure 3A:
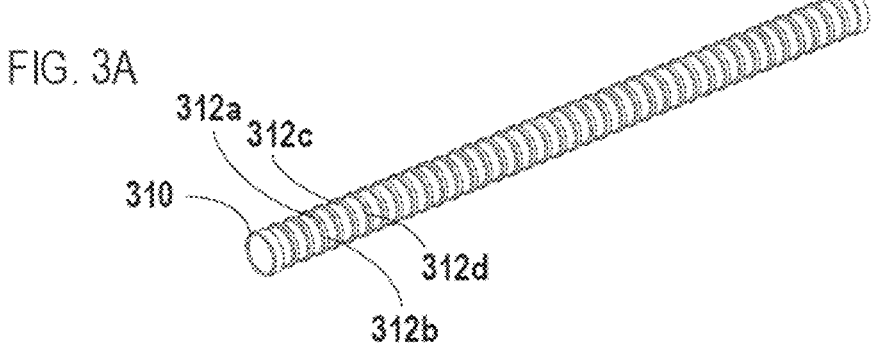
FIGS. 3A-3E illustrate various stages in a process flow of manufacturing one or more wearable ring-shaped devices, according to an embodiment.
Figure 3B:
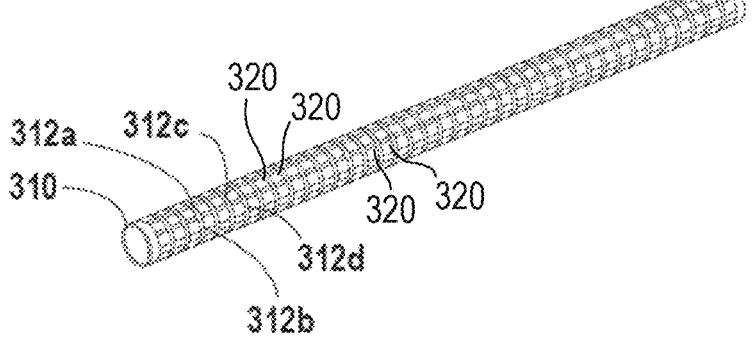
Figure 3C:
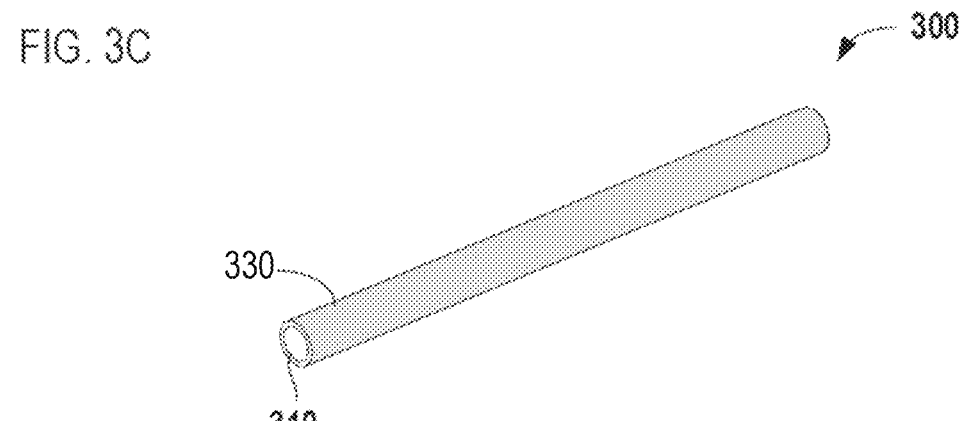
Figure 3D:
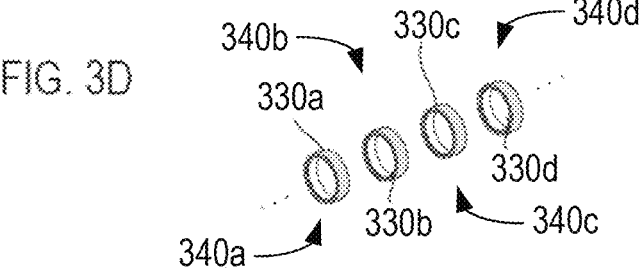
Figure 3E:
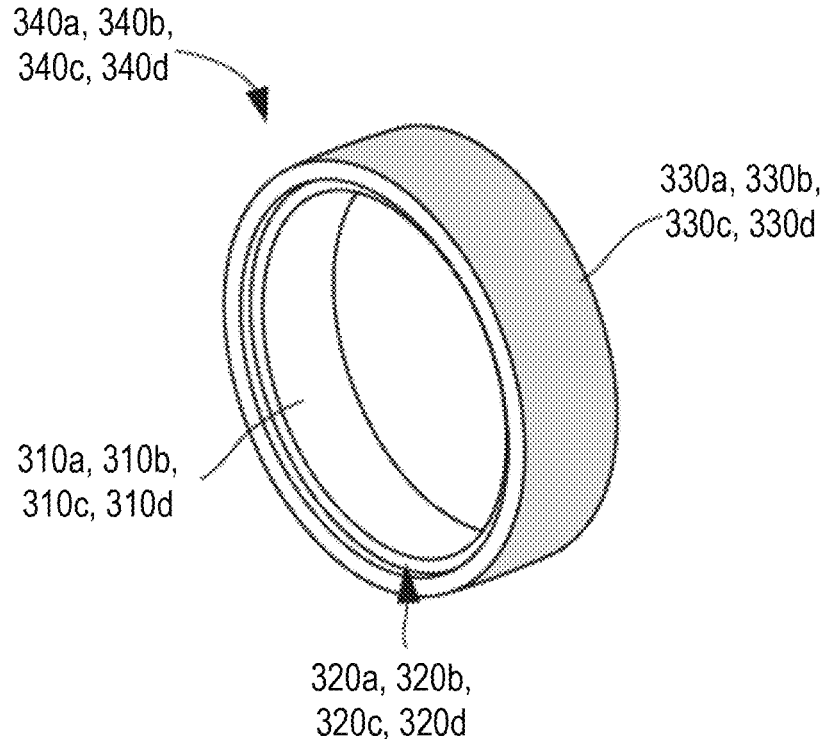
Figure 4A:
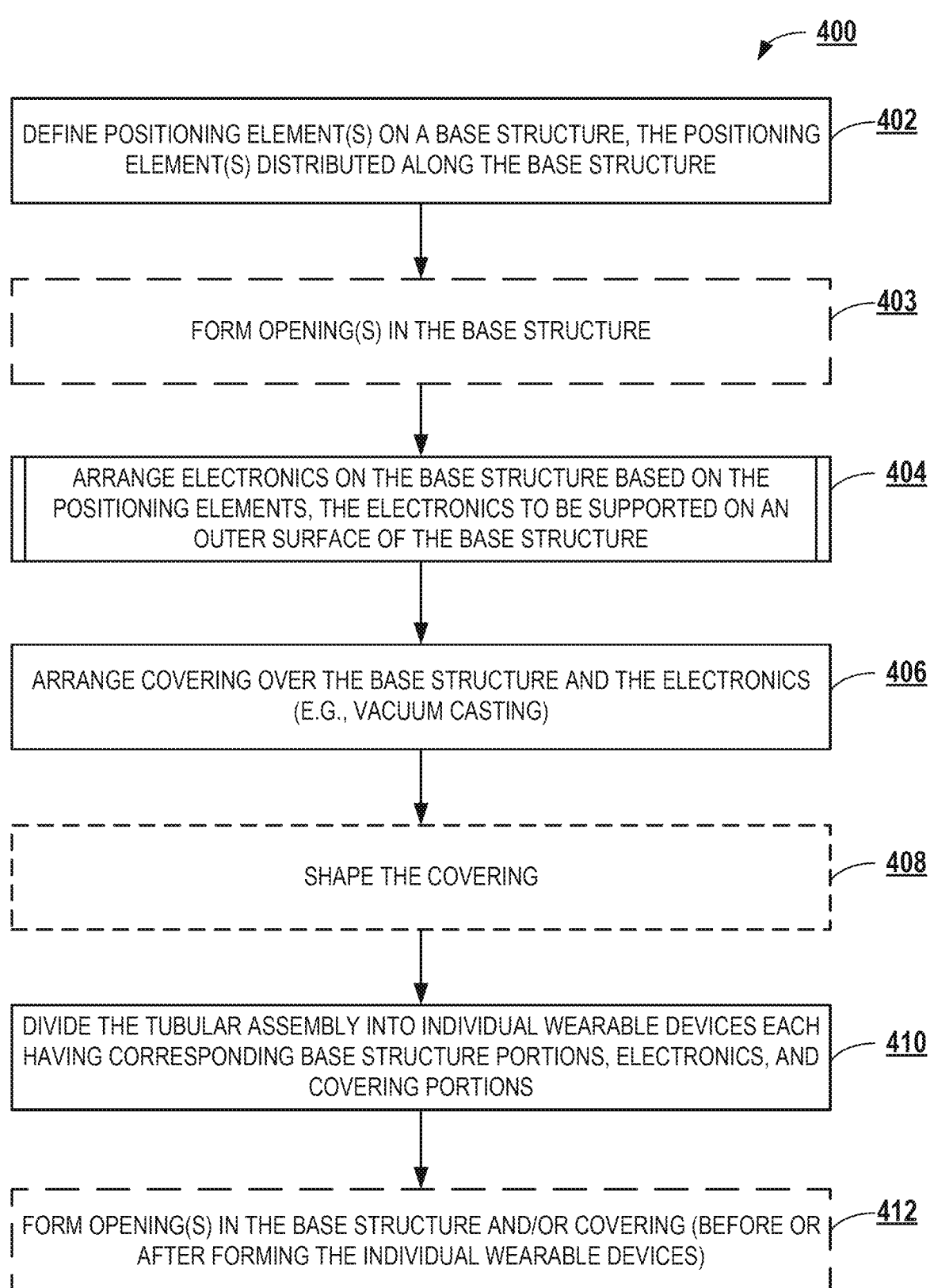

Referring now to FIG. 4A, FIG. 4A depicts a flowchart of an example method 400 of manufacturing a wearable ring-shaped device, according to an embodiment. For example, the method 400 can be implemented to manufacture example ring-shaped devices 240 of FIG. 2F and/or example ring-shaped devices 340 of FIG. 3E, and/or example ring-shaped devices 740 of FIG. 7F. For illustrative purposes, the method 400 of FIG. 4A is described in connection with FIGS. 2A-2F, 3A-3E, and 7A-7F.

Figure 2A:
FIGS. 2A-2F illustrate various stages in a process flow of manufacturing one or more wearable ring-shaped devices, according to an embodiment.
Figure 2B:
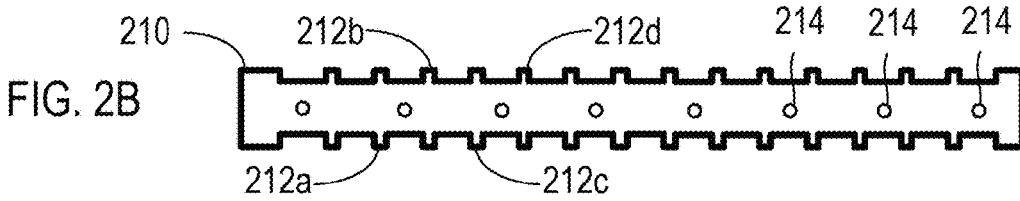
Figure 2C:
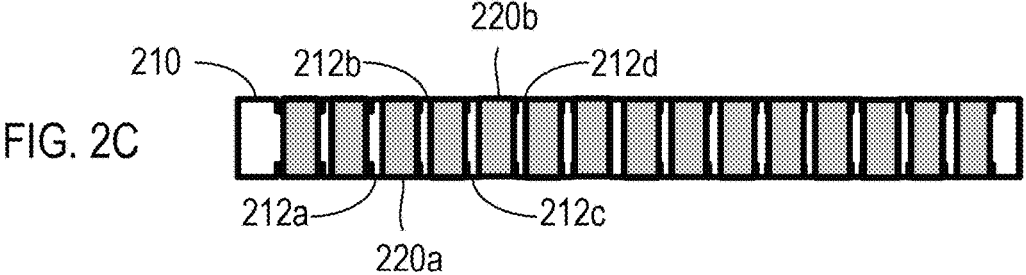
Figure 2D:
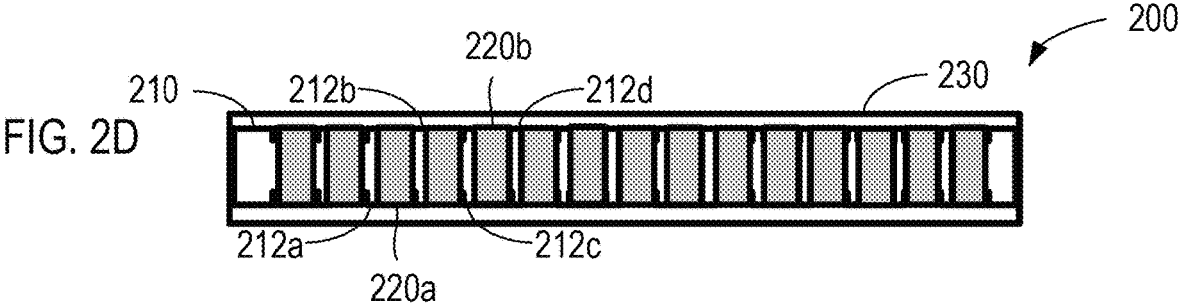
Figures 7A, 7B, 7C, 7D, 7E, 7F:
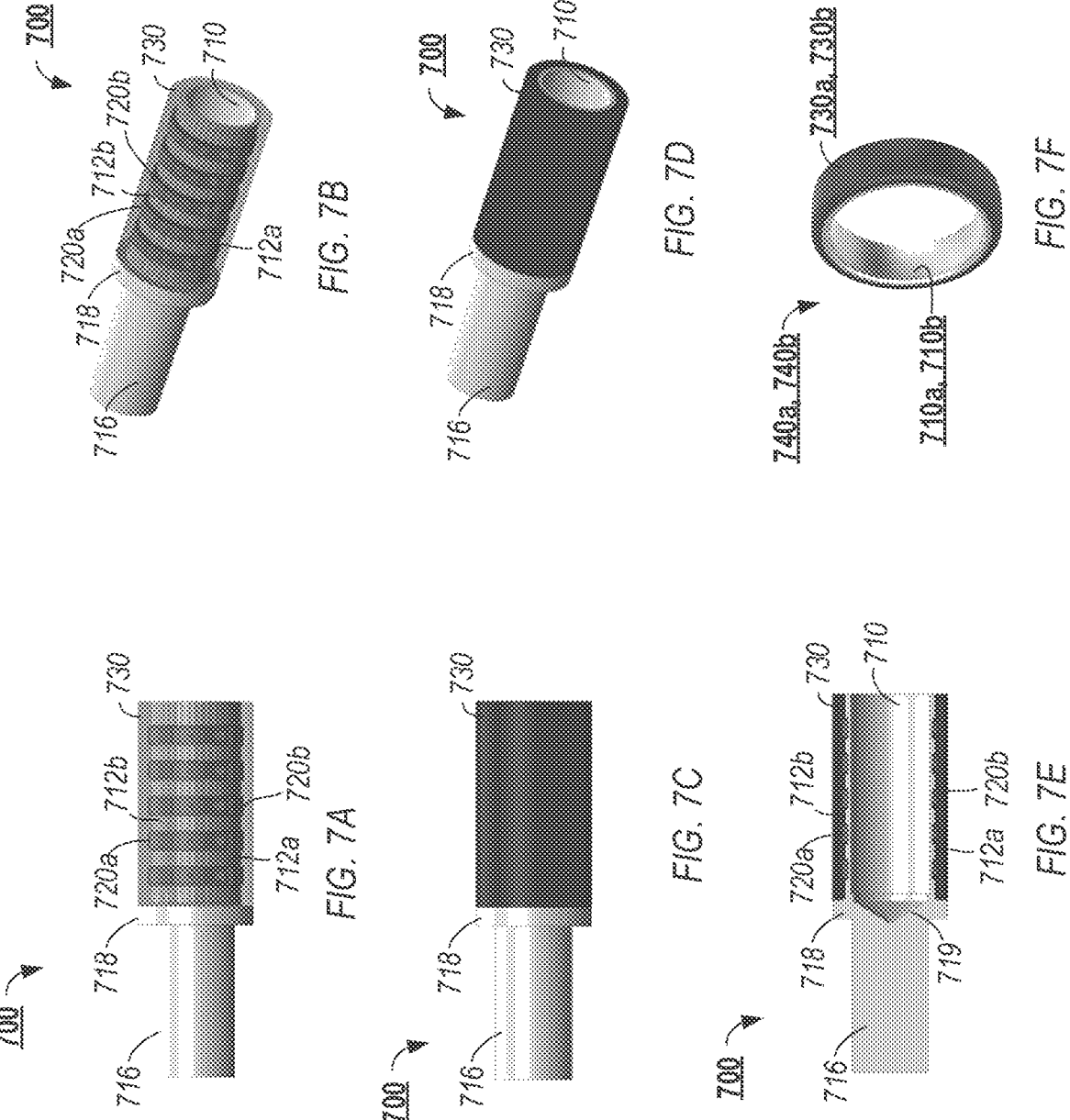
FIGS. 7A-7F illustrate various stages in a process flow of manufacturing one or more wearable ring-shaped devices, according to an embodiment.

At block 402, positioning element(s) are defined on a base structure, the positioning element(s) distributed along the base structure. As shown in FIG. 2A, a base structure 210 (e.g., structurally and/or functionally similar to the base structure 110 of FIG. 1) is provided. As shown in FIG. 2B, positioning element(s) 212 (e.g., structurally and/or functionally similar to the positioning element 112 of FIG. 1) are defined on the base structure 210. In the example of FIGS. 2A and 2B, the positioning elements 212 can be defined by forming (e.g., cutting, extruding, etc.) a plurality of indentations 212 along a longitudinal length of the base structure 210. Each of the indentations 212 being longitudinally spaced apart from adjacent indentations 212 of the plurality of indentations 212. For example, the indentation 212*b* is longitudinally spaced apart from the adjacent indentations 212*a*, 212*c*. As shown in FIG. 3A, positioning element(s) 312 (e.g., structurally and/or functionally similar to the positioning element 112 of FIG. 1 and/or the positioning elements 212 of FIGS. 2B-2F) are defined in a base structure 310 (e.g., structurally and/or functionally similar to the base structure 110 of FIG. 1 and/or the base structure 210 of FIGS. 2A-2F). As shown in FIGS. 7A, 7B, and 7C, positioning element(s) 712 (e.g., structurally and/or functionally similar to the positioning element 112 of FIG. 1, the positioning elements 212 of FIGS. 2B-2F, and/or the positioning elements 312 of FIGS. 3A and 3B) are defined in a base structure 710 (e.g., structurally and/or functionally similar to the base structure 110 of FIG. 1, the base structure 210 of FIGS. 2A-2F, and/or the base structure 310 of FIGS. 3A-3C).

In some embodiments, the base structure 710 includes a boss 716, a flange 718, and a bore 719. The boss 716 can be grasped, gripped, secured, etc., by a user or manufacturing equipment to maintain a position or stability of the base structure 710 (e.g., during assembly). The flange 718 may be positioned along a longitudinal length of the base structure 710 between the boss 716 and the positioning elements 712. In some embodiments, the flange 718 is or otherwise provides a surface, wall, backstop, etc., that contacts a covering (e.g., covering 730), as discussed in detail below in connection with block 406. In some embodiments, the flange 718 has a size (e.g., diameter, thickness, width, etc.) greater than the positioning elements 712*a*, 712*b*. In some embodiments, the bore 719 is a cone-shaped cavity that tapers in a direction from an inner diameter of the base structure 710 towards the boss 716.

In some embodiments, openings are formed in a base structure (optional block 403). As shown in FIG. 2B, openings 214 (e.g., structurally and/or functionally similar to the openings described with respect to FIG. 1) are formed in the base structure 210 (e.g., the sensors 122 of FIG. 1). In some embodiments, the openings 214 are positioned in each of the indentations 212. Although each of the indentations 212 shown in FIG. 2B include one of the openings 214, in some embodiments each of the indentations 212 can include any number (e.g., one, four, eight, etc.) of openings 214 (e.g., along a circumference of each of the indentations 212). However, a number of the openings 214 can be less than a number of the indentations 212 such that some of the indentations 212 have a corresponding opening 214 and some of the indentations 212 are smooth (e.g., having no corresponding opening 214). In some embodiments, the openings 214 can be used for sensors, as described above with respect to sensor interfaces 114. In some embodiments, the openings 214 can be used to provide electrical contacts, e.g., for charging of a battery of the PCBs 220.

At block 404, electronics are arranged on the base structure based on the positioning elements, the electronics to be supported on an outer surface of the base structure. As shown in FIG. 2C, PCBs 220 (e.g., structurally and/or functionally similar to the electronics 120 of FIG. 1) are arranged on the base structure 210 based on the positioning elements 212. Each of the PCBs 220 (e.g., the PCB 220*a*) can be coupled to the base structure 210 at a respective indentation (e.g., the indentation 212a) of the plurality of indentations 212. Put differently, the PCBs 220 can be positioned between adjacent positioning elements 212. For example, the PCB 220a is positioned between the adjacent positioning elements 212a, 212b, the PCB 220b is positioned between the adjacent positioning elements 212c, 212d, etc. Further, the PCBs 220 are supported on an outer surface of the base structure 210. In some embodiments, the coupling of the PCBs 220 includes wrapping each of the PCBs 220 around the base structure 210 within the respective grooves 212. In some embodiments, the PCBs 220 contact the outer surface of the base structure 210. In some embodiments, the PCBs 220 are positioned on the base structure 210 such that sensors of the PCB 220 are aligned with the openings 214 (see FIG. 2B). As shown in FIG. 3B, PCBs 320 (e.g., structurally and/or functionally similar to the electronics 120 of FIG. 1 and/or the PCBs 220 of FIGS. 2C-2F) are arranged on the base structure 310 based on the positioning elements 312. As shown in FIGS. 7A, 7B, and 7E, PCBs 720a, 720b (e.g., structurally and/or functionally similar to the electronics 120 of FIG. 1, the PCBs 220 of FIGS. 2C-2F, and/or the PCBs 320 of FIG. 3B) are arranged on the base structure 710 based on the positioning elements 712. A method of arranging electronics on a base structure is described in further detail below in connection with FIG. 4B.

At block 406, a covering is arranged over the base structure and the electronics. As shown in FIG. 2D, a covering 230 (e.g., structurally and/or functionally similar to the covering 130 of FIG. 1) is arranged over the base structure 210 and the PCBs 220. In some embodiments, the covering 230 is an outer layer that is coupled to the base structure 210 over the plurality of PCBs 220 to form a tubular assembly 200 (e.g., structurally and/or functionally similar to the tubular assembly 100 of FIG. 1) in which each of the PCBs 220 is disposed between a portion of the base structure 210 and a portion of the covering 230. In some embodiments, coupling the outer layer 230 to the base structure 210 over the plurality of PCBs 220 includes molding a plastic material over the base structure 210 and the plurality of PCBs 220. In some embodiments, the molding includes at least one of vacuum casting, injection molding, or reaction injection molding. In some embodiments, the plastic material includes at least one of polyurethane, epoxy, etc. In FIG. 3C, a covering 330 (e.g., structurally and/or functionally similar to the covering 130 of FIG. 1 and/or the covering 230 of FIGS. 2D-2F) is arranged over the base structure 310 and the PCBs 320 (see FIG. 3B). In some embodiments, the covering 330 is an outer layer that is coupled to the base structure 310 over the plurality of PCBs 320 to form a tubular assembly 300 (e.g., structurally and/or functionally similar to the tubular assembly 100 of FIG. 1 and/or the tubular assembly 200 of FIGS. 2D and 2E) in which each of the PCBs 320 is disposed between a portion of the base structure 310 and a portion of the covering 330. In some embodiments, the covering 230 and/or the covering 330 are shaped (optional block 408). For example, shaping can include grinding or polishing the covering 230 and/or the covering 330. Shaping of the covering 230 and/or the covering 330 can occur prior to separating the tubular assembly. In some embodiments, openings are made in the covering 230 and/or the covering 330.

Figure 2E:
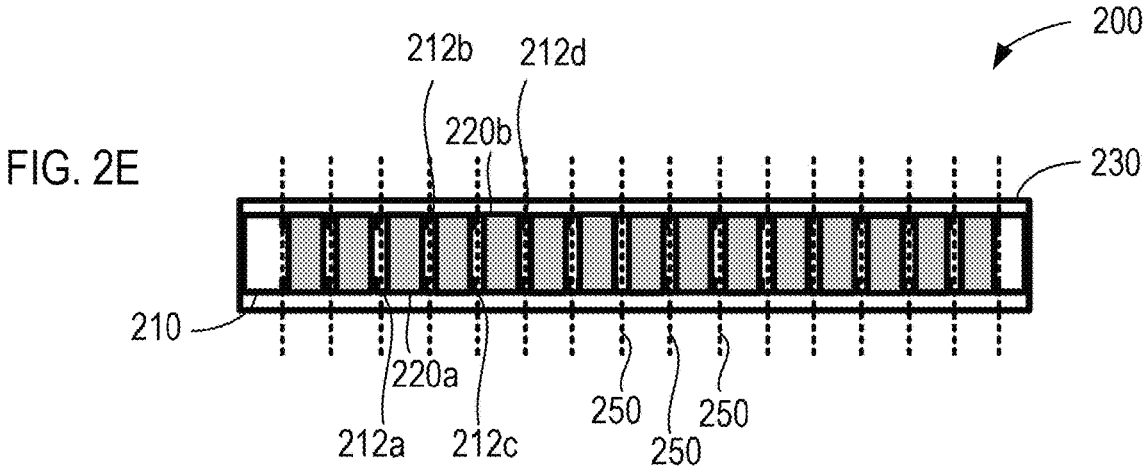
Figure 2F:
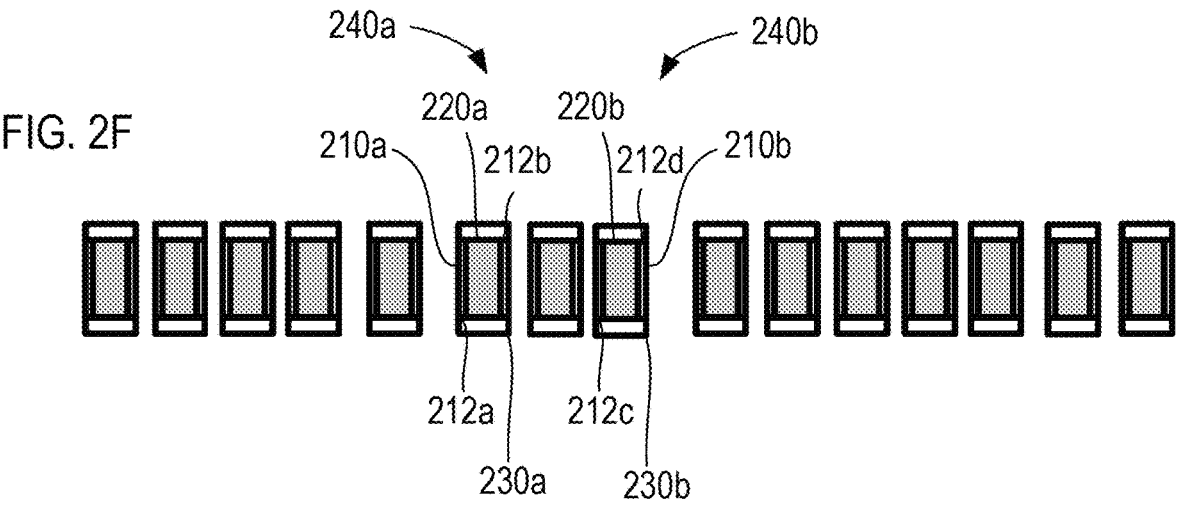

As shown in FIGS. 7A-7E, the covering 730 (e.g., structurally and/or functionally similar to the covering 130 of FIG. 1, the covering 230 of FIGS. 2D-2F, and/or the covering 330 of FIG. 3C) is arranged over the base structure 710 and the PCBs 720. In some embodiments, the covering 730 is an outer layer that is coupled to the base structure 710 over the plurality of PCBs 720 to form a tubular assembly 700 (e.g., structurally and/or functionally similar to the tubular assembly 100 of FIG. 1, the tubular assembly 200 of FIGS. 2D and 2E, and/or the tubular assembly 300 of FIG. 3C). In FIGS. 7A-7B, the covering 230 is illustrated as partially transparent for purposes of illustration and clarity. The covering 730 can extend from the flange 218 along a longitudinal direction of the base structure 710 over the positioning elements 712 and the PCBs 720. In some embodiments, an outer diameter defined by the covering 730 is aligned with or is about the same as a diameter of the flange 718.

While the coverings described herein are described as plastic material that is cast on the base structure and the electronics, it can be appreciated that other types of materials can be used, including, for example, metal, silicone, or any other materials that can be applied in liquid or solid form. For example, a second tubular structure (e.g., a metal tube or pipe) can be positioned over the base structure and electronics, and then the individual wearable rings can be cut from the combined assembly.

At block 410, the tubular assembly is divided into individual wearable devices each having corresponding base structure portions, PCBs, and covering portions. As shown in FIG. 2F, the tubular assembly 200 can be divided into individual wearable devices (e.g., the ring-shaped devices 240) each having corresponding base structure portions 210a, 210b, PCBs 220a, 220b, and covering portions 230a, 230b. As shown in FIG. 2E, the tubular assembly 200 may be divided at locations illustrated by dashed lines 250. In some embodiments, separating the tubular assembly 200 includes cutting the tubular assembly 200 between each indentation 212 of the plurality of indentations 212 (e.g., at the dashed lines 250). As shown FIGS. 3D and 3E, the tubular assembly 300 can be divided into individual wearable devices (e.g., the ring-shaped devices 340) each having corresponding base structure portions 310a-310d, PCBs 320a-320d, and covering portions 330a-330d. As shown in FIG. 7F, the tubular assembly 700 can be divided into individual wearable devices (e.g., the ring-shaped devices 740) each having corresponding base structure portions 710 and covering portions 730.

In some embodiments, positioning elements are added to (e.g., positioned on) a corresponding base structure (e.g., the base structure 110 of FIG. 1, the base structure 210 of FIGS. 2A-2F, and/or the base structure 310 of FIGS. 3A-3E). For example, the positioning elements may be walls, ribs, gaskets, or other types of annular components that at least partially surround an outer surface of the corresponding base structure. PCBs (e.g., the PCBs 220 and/or the PCBs 320) and gaskets, for example, can be positioned on a corresponding base structure in sequence with one another. For example, a first gasket can be placed, routed, guided, etc., in a first position on a corresponding base structure followed by placement of a first PCB adjacent to the first gasket. Specifically, the first gasket can provide a wall and/or support for a side of the first PCB. In turn, a second gasket can be placed, routed, guided, etc., into a second position on the corresponding base structure, the second position spaced apart from the first position along a longitudinal length of the base structure. In some embodiments, the first PCB is positioned or otherwise sandwiched between the first and second gaskets. A second PCB can be placed on the base structure adjacent to the second gasket such that the second gasket can provide a wall and/or support for a side of the first PCB and a side of the second PCB. In some embodiments, a length (e.g., partial length or full length) of the base structure is assembled by alternating placements of PCBs and gaskets along the outer surface of the base structure. In turn, a covering (e.g., structurally and/or functionally similar to the covering 130 of FIG. 1, the covering 230 of FIGS. 2D-2F, and/or the covering 330 of FIGS. 3C-3E) is arranged to cover the PCBs, the gaskets, and the base structure (block 406) to define a tubular assembly. In turn, the covering 230 can be shaped (optional block 408) and the tubular assembly can be divided (block 410) to form individual ring-shaped devices. In some embodiments, the base structure defines an inner annular surface of the ring-shaped devices. Alternatively, the PCBs may include an inner surface or other structure such that the base structure can be removed from each of the ring-shaped devices.

Optionally, in some embodiments, one or more openings, windows, holes, cavities, passages, etc. can be formed in the base structure, the covering, and/or the individual wearable devices (e.g., in their corresponding base structure portions and/or covering portions) at any time during the assembly and manufacturing process (block 412). For example, after forming the individual wearable devices at 410, the method can include post-processing the wearable devices to form one or more openings, windows, holes, cavities, passages, etc. As described above, these openings, windows, holes, cavities, passages, etc. can be used to provide sensor interfaces, electrical contacts, and/or other functions (e.g., aesthetics, light guides, etc.). Alternatively, when applying the covering at 406, one or more protrusions, spacers, etc. can be used to cause an opening or window to form when the covering is being applied.

Figure 5:
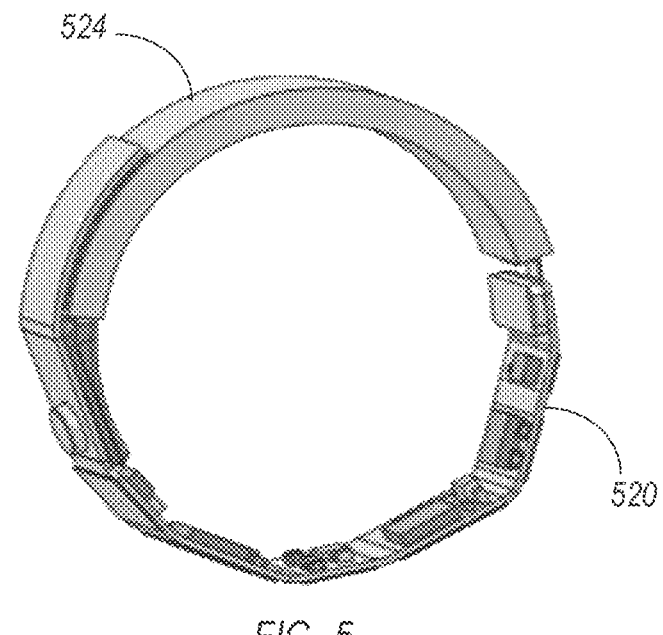
FIG. 5 is an example curved battery and example curved electronics of a wearable ring-shaped device, according to an embodiment.

FIG. 5 is an example curved battery 524 and example curved electronics 520 of a ring-shaped device, according to an embodiment. The curved battery 524 of FIG. 5 can be structurally and/or functionally similar to the battery 124 of FIG. 1. The curved electronics 520 of FIG. 5 are structurally and/or functionally similar to the electronics 120 of FIG. 1, the electronics 220 of FIGS. 2C-2F, and/or the electronics 320 of FIGS. 3B-3E. In the example of FIG. 5, ends of the battery 524 can be coupled (e.g., soldered) to ends of the electronics 520 to define a loop or ring structure. When the battery 524 and the electronics 520 are coupled to a corresponding base structure, the electronics 520 can partially wrap around a first segment of a groove (e.g., the groove 312a) and the battery 524 can partially wrap around a second segment of a groove. In some embodiments, the electronics 520 overlaps a portion of the battery 524.

Figure 6:
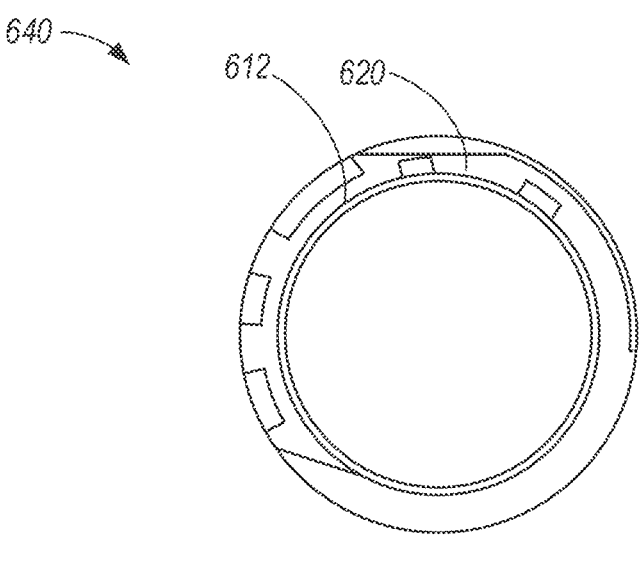
FIG. 6 is a cross-sectional view of an example wearable ring-shaped device, according to an embodiment.

FIG. 6 is a cross-sectional view of an example ring-shaped device 640, according to an embodiment. The ring-shaped device 640 of FIG. 6 can be structurally and/or functionally similar to the ring-shaped devices 240 of FIG. 2F and/or the ring-shaped devices 340 of FIGS. 3D-3E. The ring-shaped device 640 can include electronics 620 (e.g., structurally and/or functionally similar to the electronics 120 of FIG. 1, the electronics 220 of FIGS. 2C-2F, the electronics 320 of FIGS. 3B-3E, and/or the electronics 520 of FIG. 5). The electronics 620 partially cover a groove 612 (e.g., structurally and/or functionally similar to the positioning element 112 of FIG. 1, the positioning elements 212 of FIGS. 2B-2F, and/or the positioning elements 312 of FIGS. 3A-3C).

Referring now to FIG. 4B, FIG. 4B depicts a flowchart of an example method 404 of manufacturing a wearable ring-shaped device, according to an embodiment. In particular, the method 404 may be a subprocess used to implement block 404 of FIG. 4A. The method 404 shown in FIG. 4B represents an example implementation of block 404. Other implementations, variations, or subprocesses may be used without departing from the scope of systems, methods, and devices described herein. For illustrative purposes, the method 404 of FIG. 4B is described in connection with FIGS. 8A-8M. The method 404 as described in connection with FIGS. 8A-8M includes reference to a single battery, a single PCB, and a single base structure. However, the method 404 can be implemented to assemble multiple batteries and/or multiple PCBs to a single base structure.

Figure 8A:
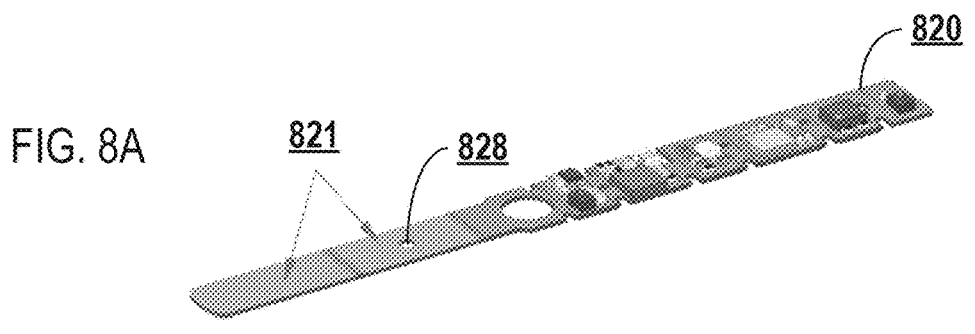
FIGS. 8A-8M illustrate various stages in a process flow of manufacturing one or more wearable ring-shaped devices, according to an embodiment.

At block 414, a PCB having at least one positioning element is provided. As shown in FIG. 8A, a PCB 820 (e.g., structurally and/or functionally similar to the PCB 120 of FIG. 1, the PCBs 220 of FIGS. 2C-2F, the PCBs 320 of FIG. 3B, and/or the PCBs 720 of FIGS. 7A, 7B, and 7E) having a positioning element 828 is provided. In some embodiments, the positioning element 828 may be structurally and/or functionally similar to other positioning elements described herein. For example, the positioning element 828 can be any suitable structure (e.g., an indentation) configured to facilitate positioning of electronics and/or other components on, in, and/or along the PCB 820. In FIG. 8A, the positioning element 828 can be a hole. In some embodiments, the PCB 820 can be secured using adhesive films 821. In some embodiments, the PCB 820 includes protective films that cover the adhesive films 820 such that the protective films are removed (e.g., peeled off) to expose the adhesive films 820. In some embodiments, the adhesive films 820 span or extend across a first portion (e.g., segment) of the PCB 820.

Figure 8B:
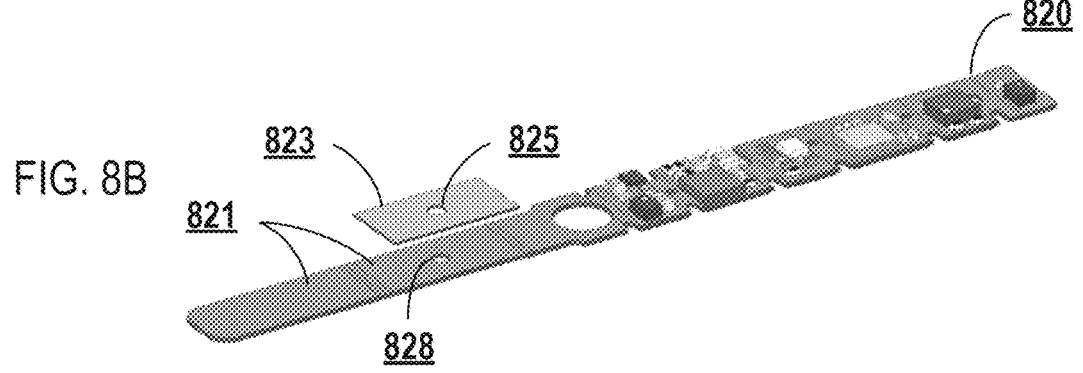
Figure 8C:
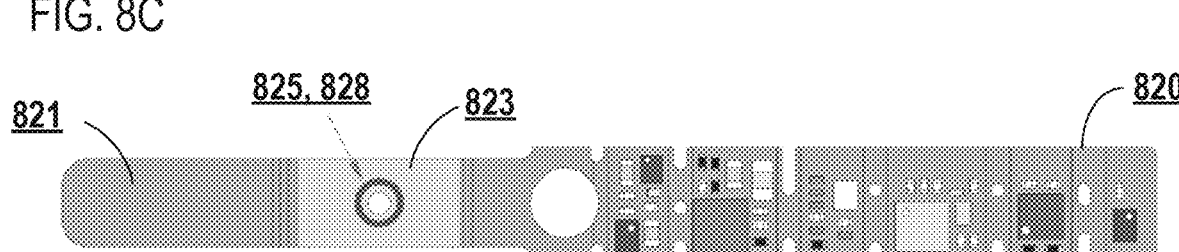

At block 416, a charging component is arranged on the PCB based on a positioning element. As shown in FIGS. 8B and 8C, a charging component 823 is arranged on the PCB 820 based on the positioning element 828. In some embodiments, arranging the charging component 823 on the PCB 820 includes aligning a positioning element 825 (e.g., structurally and/or functionally similar to other positioning elements described herein) of the charging component 823 with the positioning element 828. For example, the positioning element 825 may be made about concentric with the positioning element 828. In this manner, the charging component 823 may be aligned with the PCB 820 such that the edges of the charging component 823 are about parallel or flush with the edges of the PCB 820. A first side of charging component 823 can couple (e.g., adhere) to the PCB 720 by being positioned on one of the adhesive films 821. In some embodiments, a second side of the charging component 823 (e.g., facing away from the first side) includes an adhesive. In some embodiments, the charging component 823 includes ferrite to facilitate wireless charging between a battery (e.g., the battery 824) and a charger (not shown). In some embodiments, the charging component 823 is a ferrite sheet.

Figure 8D:
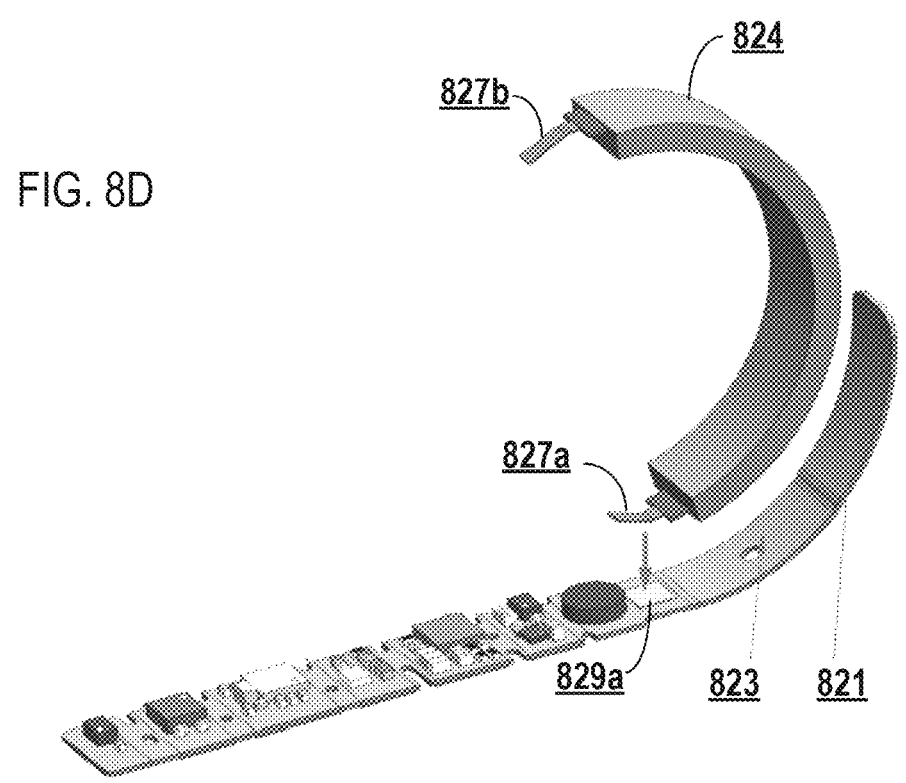
Figure 8E:
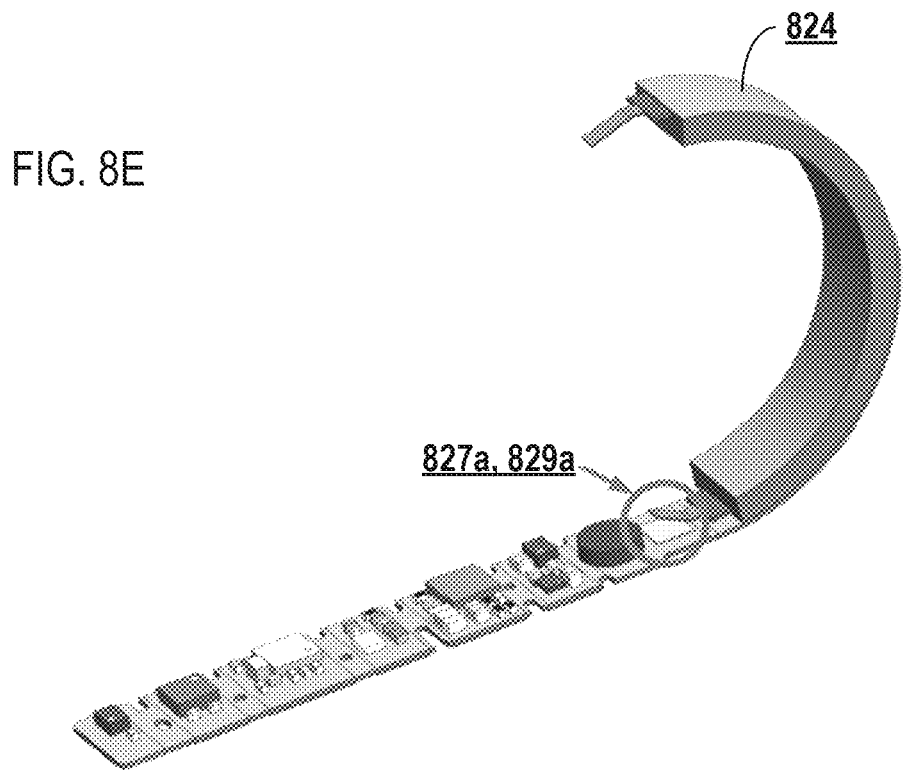

At block 418, a battery is arranged on a first portion of the PCB. As shown in FIGS. 8D and 8E, the battery 824 (e.g., structurally and/or functionally similar to the battery 124 of FIG. 1 and/or the battery 524 of FIG. 5) is arranged on the first portion of the PCB 820 (e.g., the first portion having the adhesive films 821 and the charging component 823). The battery 824 can include opposing ends having tabs 827a, 827b disposed at and/or extending away from the opposing ends. As shown in FIG. 8E, the end of the battery 824 having the tab 827a may be coupled to the PCB 820. For example, the tab 827a may be soldered to an attachment zone 829a (e.g., soldering pad) on the PCB 820 (e.g., to facilitate and/or supplement coupling between the battery 824 and the PCB 820).

Figure 8F:
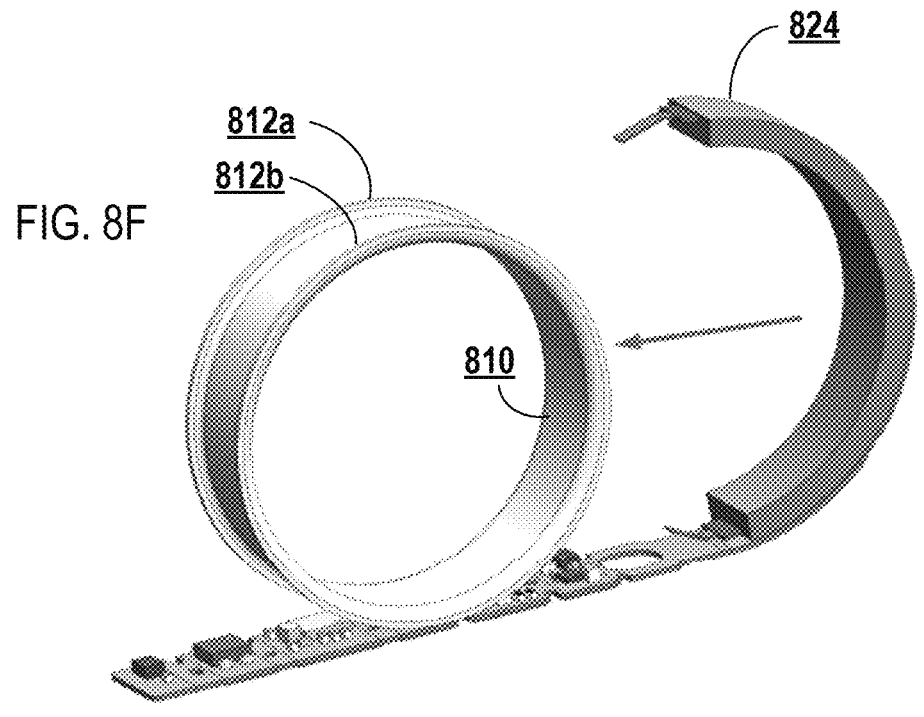
Figure 8G:
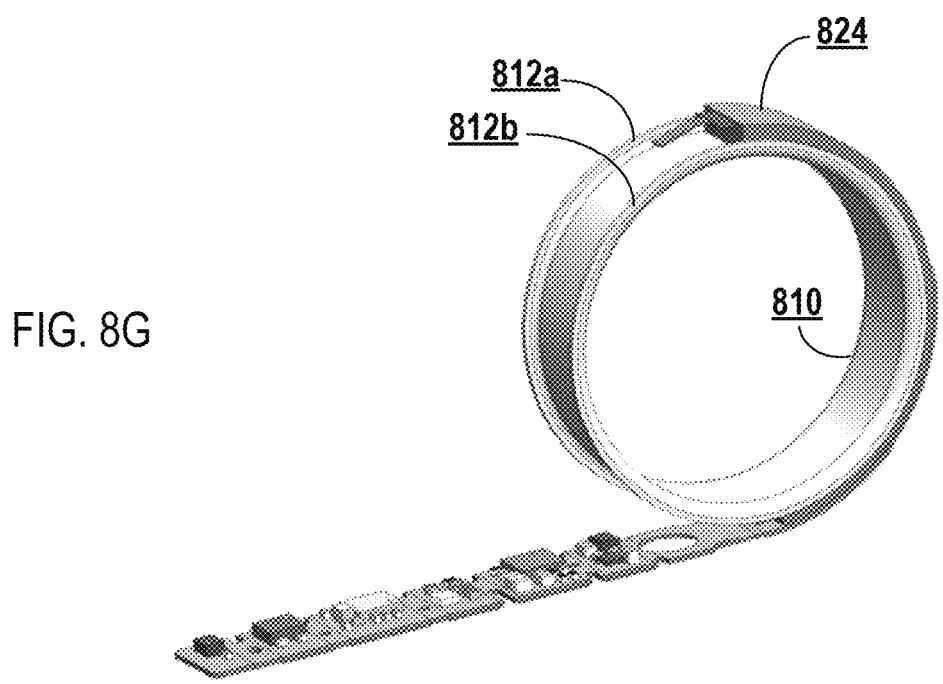

At block 420, the first portion of the PCB and the battery are arranged on a first portion of the base structure. As shown in FIGS. 8F and 8G, the first portion of the PCB 820 and the battery 824 are arranged on a first portion (e.g., side, region, area, etc.) of a base structure 810 (e.g., structurally and/or functionally similar to the base structure 110 of FIG. 1, the base structure 210 of FIGS. 2A-2E, the base structure 310 of FIGS. 3A and 3B, and/or the base structure 710 of FIGS. 7A-7E). The PCB 820 and the battery 824 can be fitted, wrapped, adhered (e.g., with glue), etc., onto the base structure 810 between positioning elements 812a, 812b (e.g., structurally and/or functionally similar to positioning elements 112 of FIG. 1, the positioning elements 212 of FIGS. 2A-2F, the positioning elements 312 of FIGS. 3A and 3B, and/or the positioning elements 712 of FIGS. 7A-7E). In the examples of FIGS. 8F-8O, only a portion (e.g., one portion) of the base structure 810 is shown for purposes of illustration and clarity. For example, only two of the positioning elements 812a, 812b are shown. However, the base structure 810 can be configured to support any number of PCBs 820 and batteries 824 with any number of positioning elements 812 (e.g., along a longitudinal length of the base structure 810).

Figure 8H:
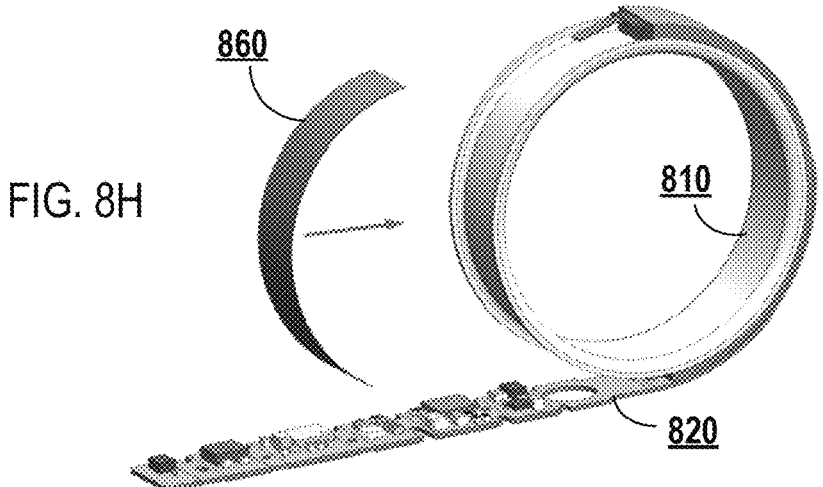
Figure 8I:
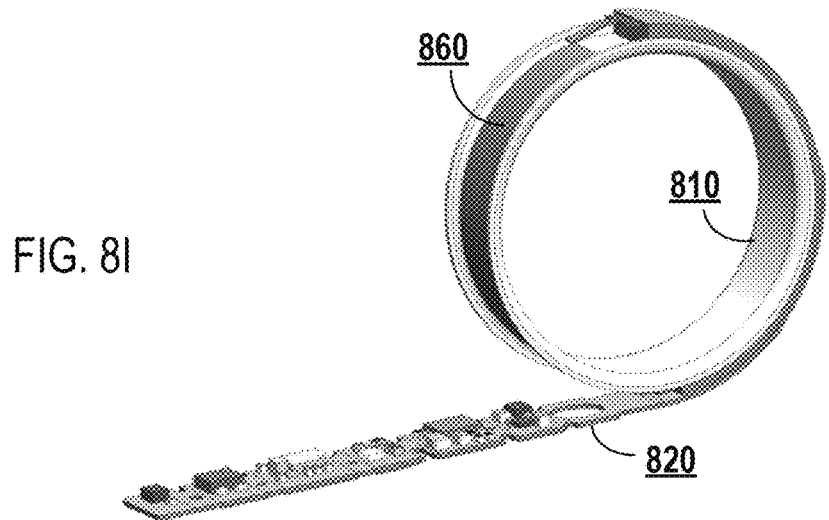
Figure 8J:
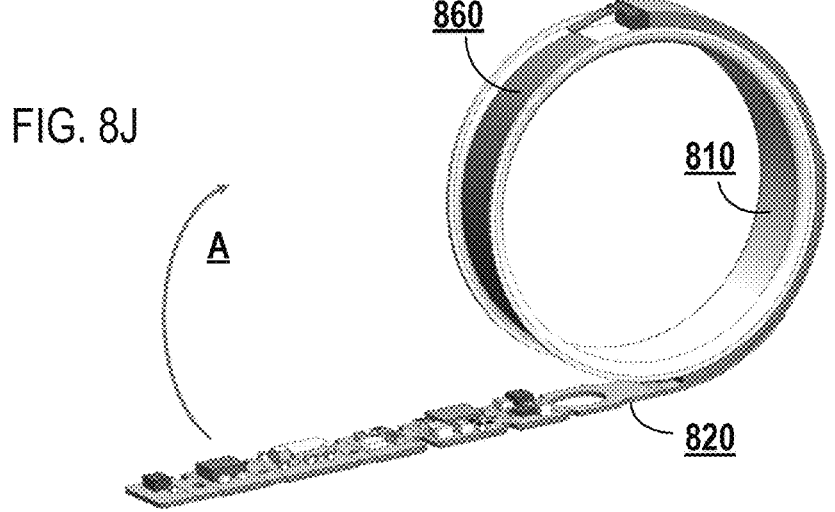

At block 422, an adhesive is disposed on a second portion of the base structure. As shown in FIGS. 8H and 8I, an adhesive 860 is disposed on a second portion (e.g., side, region, area, etc.) of the base structure 810. In some embodiments, the second portion of the base structure 810 is separate from, adjacent to, or opposite from the first portion of the base structure 810. In some embodiments, the adhesive 860 is thermally conductive, such as, for example, a thermally conductive tape configured to dissipate heat (e.g., heat generated by the PCB 820 and/or other electronic components) to the base structure 810.

Figure 8K:
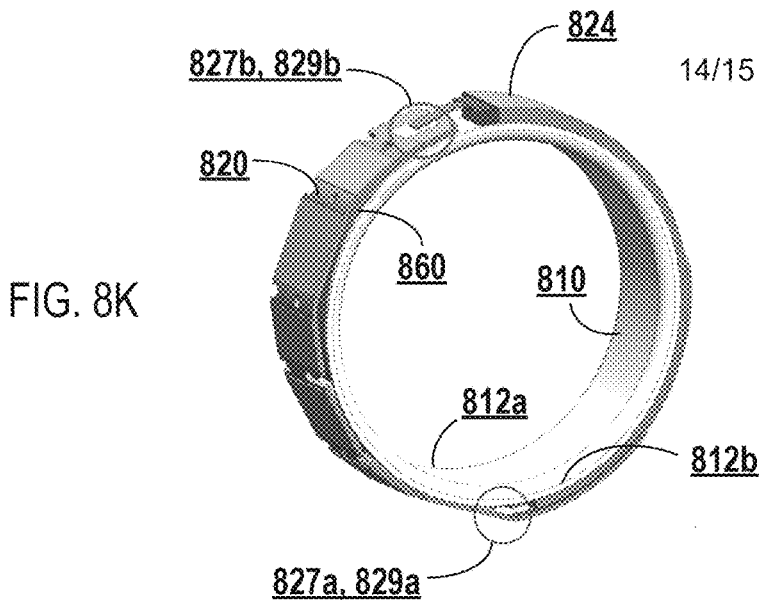

At block 424, a second portion of the PCB is arranged on the second portion of the base structure with the adhesive positioned therebetween. As shown in FIG. 8K, a second portion of the PCB 820 is arranged on the second portion of the base structure 810 with the adhesive 860 positioned therebetween. As such, the PCB 820 and/or the battery 824 can be secured to the base structure 810 using the adhesive 860. In some embodiments, the second portion of the PCB 820 can be wrapped, folded, bent, or otherwise maneuvered in a direction generally indicated by arrow A in FIG. 8L to position the second portion of the PCB 820 on and/or around the second portion of the base structure 810. In this manner, the battery 824 and the PCB 820 can be wrapped around the base structure 810 such that the battery 824 and the PCB 820 are disposed between adjacent positioning elements 812a, 812b of a plurality of positioning elements 812 disposed along the base structure 810. Further, the battery 824 and the PCB 820 can be spaced from additional batteries and PCBs wrapped around the base structure 810. In some embodiments, the tab 827b of the battery 824 can be coupled (e.g., soldered) to an attachment zone 829b (e.g., soldering pad) of the PCB 820 to facilitate and/or secure the connection between the PCB 820, the battery 824, and the base structure 810.

Figure 8L:
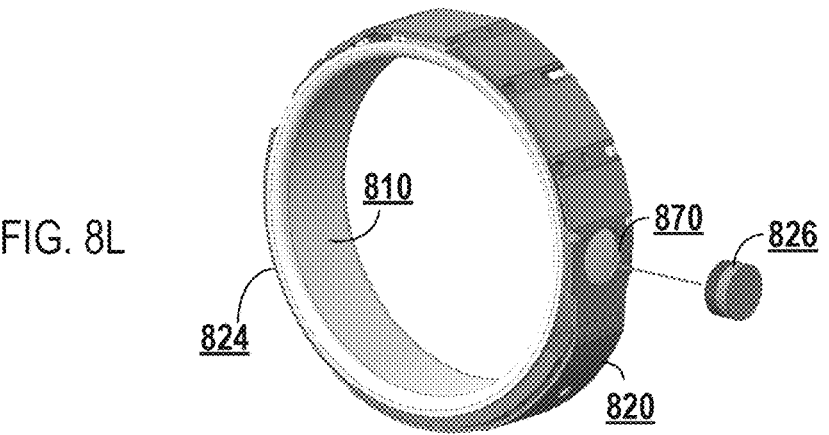
Figure 8M:
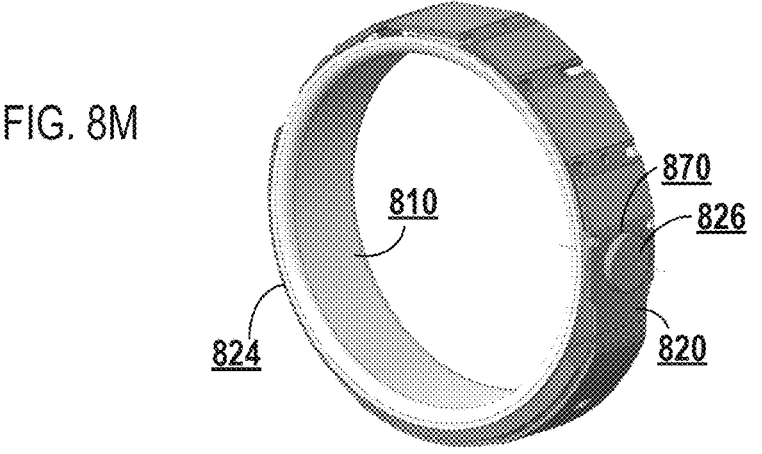

At block 426, an alignment element is arranged in the PCB based on a positioning element. As shown in FIGS. 8L and 8M, an alignment element 826 is arranged in the PCB 820 based on a positioning element 870 (e.g., structurally and/or functionally similar to other positioning elements described herein) of the PCB 820. In some embodiments, the alignment element 826 is adhered to at least one of the PCB 820 or the base structure 810 (e.g., with glue). In some embodiments, the alignment element 826 is a magnet that can magnetically couple to magnets in an external structure or component (e.g., a charger). In some embodiments, the alignment element 826 is a magnet having a south pole that faces inward towards an inner diameter of the base structure 810 and a north pole that faces away from the base structure 810. Then, the process can return to block 406 of FIG. 4A.

Figures 8N, 8O:
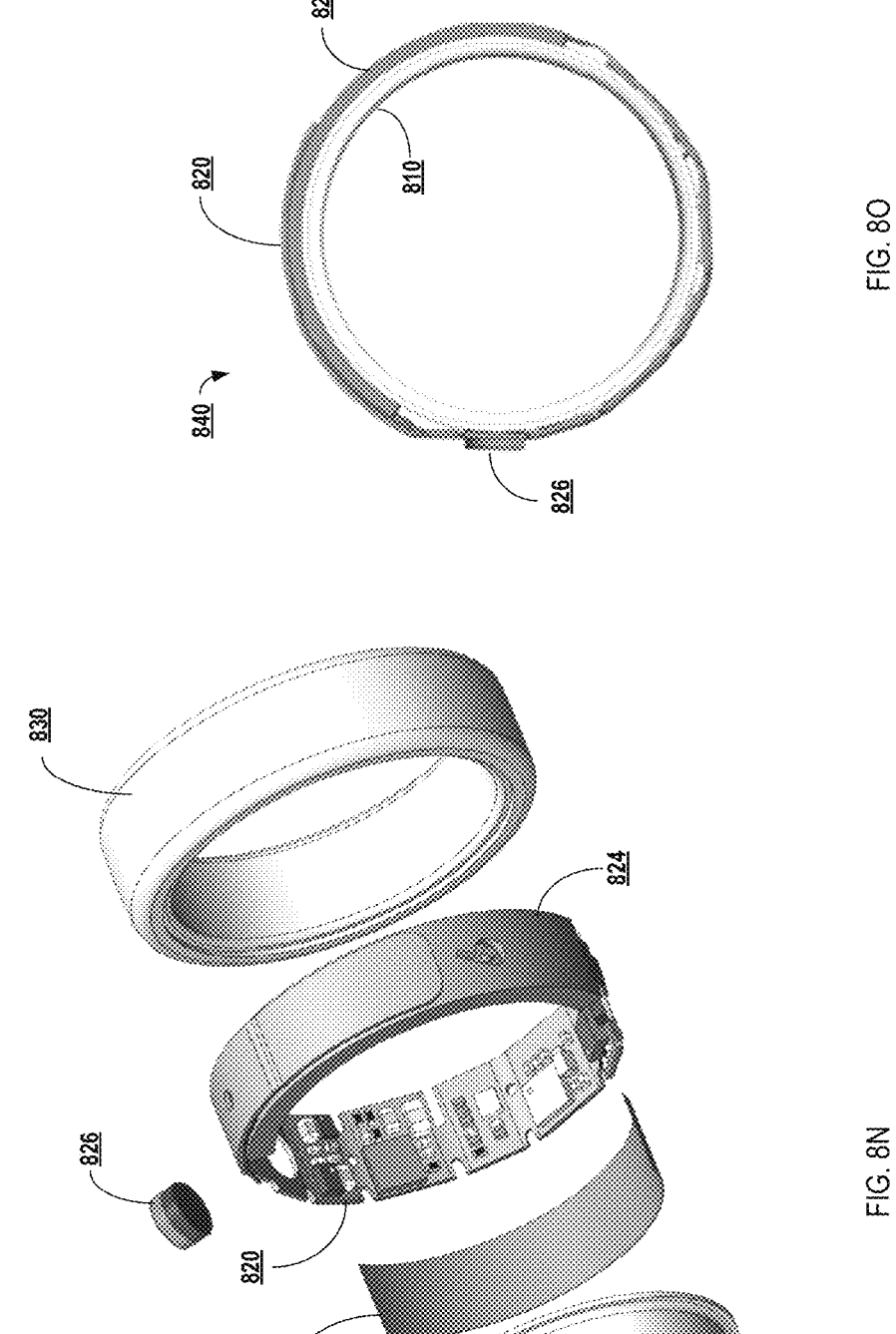
FIG. 8N is an exploded view of the wearable ring-shaped device of FIG. 8M, according to an embodiment.
FIG. 8O is a side view of the wearable ring-shaped device of FIGS. 8M-8N, according to an embodiment.

FIG. 8N is an exploded view of a wearable device 840 including the base structure 810, the adhesive 860, the PCB 820, the alignment element 826, the battery 824, and a covering 830 (e.g., structurally and/or functionally similar to the covering 130 of FIG. 1, the covering 230 of FIGS. 2D-2F, the covering 330 of FIGS. 3C-3E, and/or the covering 730 of FIGS. 7A-7F). FIG. 8O is a side view of the wearable device 840, with the covering 830 removed for purposes of clarity.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

As used in this specification and/or any claims included herein the singular forms "a," "an," and "the" include plural referents unless the context clearly dictates otherwise. Thus, for example, the term "a member" is intended to mean a single member or a combination of members, "a material" is intended to mean one or more materials, and/or the like.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein, the terms "about," "approximately," and/or "substantially" when used in connection with stated value(s) and/or geometric structure(s) or relationship(s) is intended to convey that the value or characteristic so defined is nominally the value stated or characteristic described. In some instances, the terms "about," "approximately," and/or "substantially" can generally mean and/or can generally contemplate a value or characteristic stated within a desirable tolerance, e.g., plus or minus 10% of the value or characteristic stated. For example, a value of about 0.01 can include 0.009 and 0.011, a value of about 0.5 can include 0.45 and 0.55, a value of about 10 can include 9 to 11, and a value of about 1000 can include 900 to 1100. Similarly, a first surface may be described as being substantially parallel to a second surface when the surfaces are nominally parallel. While a value, structure, and/or relationship stated may be desirable, it should be understood that some variance may occur as a result of, for example, manufacturing tolerances or other practical considerations (such as, for example, the pressure or force applied through a portion of a device, conduit, lumen, etc.). Accordingly, the terms "about," "approximately," and/or "substantially" can be used herein to account for such tolerances and/or considerations.

Also, various inventive concepts may be embodied as one or more methods. The acts performed as part of these methods may be ordered in any suitable way. Accordingly, embodiments may be constructed in which acts are performed in an order different than those described, which may include performing some acts simultaneously, even though described as sequential acts in illustrative embodiments.

What is claimed is:

1. A method, comprising:
   coupling a plurality of printed circuit boards to a tubular structure, each printed circuit board of the plurality of printed circuit boards being coupled at a separate location along a longitudinal length of the tubular structure and being spaced from adjacent printed circuit boards of the plurality of printed circuit boards;
   coupling an outer layer to the tubular structure over the plurality of printed circuit boards to form a tubular assembly in which each printed circuit board of the plurality of printed circuit boards is disposed between a portion of the tubular structure and a portion of the outer layer; and
   separating the tubular assembly into a plurality of ring-shaped devices each including a printed circuit board of the plurality of printed circuit boards, the portions of the tubular structure and the outer layer disposed around the printed circuit board.

2. The method of claim 1, further comprising forming a plurality of indentations along a longitudinal length of a tubular structure, each indentation being longitudinally spaced from adjacent indentations of the plurality of indentations,
   wherein each printed circuit board of the plurality of printed circuit boards are coupled to the tubular structure at a respective indentation of the plurality of indentations.

3. The method of claim 2, wherein the plurality of indentations is a plurality of grooves.

4. The method of claim 3, wherein each groove of the plurality of grooves is spaced from adjacent grooves of the plurality of grooves by at least a predetermined axial distance of 1 mm.

5. The method of claim 3, wherein each groove of the plurality of grooves extends circumferentially around an outer surface of the tubular structure.

6. The method of claim 5, wherein coupling the plurality of printed circuit boards includes wrapping each printed circuit board of the plurality of printed circuit boards around the tubular structure within the respective groove of the plurality of grooves.

7. The method of claim 1, wherein the tubular structure has a length of at least about 10 cm.

8. The method of claim 2, wherein the tubular structure is a metal pipe.

9. The method of claim 8, wherein forming the plurality of indentations includes machining the plurality of indentations in the metal pipe.

10. The method of claim 1, wherein the plurality of printed circuit boards is coupled to the tubular structure via an adhesive.

11. The method of claim 1, wherein coupling the outer layer to the tubular structure over the plurality of printed circuit boards includes molding a plastic material over the tubular structure and the plurality of printed circuit boards.

12. The method of claim 11, wherein the molding includes at least one of: vacuum casting, injection molding, or reaction injection molding.

13. The method of claim 11, wherein the plastic material includes at least one of polyurethane or epoxy.

14. The method of claim 1, further comprising:
   shaping, prior to separating the tubular assembly, the outer layer of the tubular assembly.

15. The method of claim 14, wherein the shaping includes grinding or polishing the outer layer.

16. The method of claim 2, wherein separating the tubular assembly includes cutting the tubular assembly between each indentation of the plurality of indentations.

17. The method of claim 2, wherein the plurality of printed circuit boards includes one or more sensors, the method further comprising:
   forming, prior to coupling the plurality of printed circuit boards to the tubular structure, holes in the tubular structure at the plurality of indentations such that the one or more sensors can interface with an external environment via the holes.

18. A method comprising:
   coupling an end of a curved battery to a printed circuit board;
   wrapping the curved battery and the printed circuit board around a tubular structure such that the curved battery and the printed circuit board are disposed between adjacent positioning elements of a plurality of positioning elements disposed along the tubular structure and are spaced from additional curved batteries and printed circuit boards wrapped around the tubular structure; and
   securing the curved battery and the printed circuit board to the tubular structure using adhesive tape.

19. The method of claim 18, further comprising:
   coupling an outer layer to the tubular structure over the curved battery and the printed circuit board to form a tubular assembly in which the curved battery and the printed circuit board are disposed between a portion of the tubular structure and a portion of the outer layer; and
   separating the tubular assembly into a plurality of ring-shaped devices including a ring-shaped device that includes the curved battery and the printed circuit board, the portions of the tubular structure and the outer layer disposed around the curved battery and the printed circuit board.

20. The method of claim 18, wherein the end of the curved battery is a first end of the curved battery, the method further comprising:

coupling, after wrapping the curved battery and the printed circuit board around the tubular structure, a second end of the curved battery to the printed circuit board.

* * * * *